United States Patent [19]

Marshall et al.

[11] Patent Number: 4,848,160
[45] Date of Patent: Jul. 18, 1989

[54] MULTI-AXIS TEST FIXTURE SYSTEM

[75] Inventors: Philip Marshall, Lexington; Jeffrey Marshall; Paul Ford, both of Arlington; Darryl Huttunen, Malden, all of Mass.

[73] Assignee: M/RAD Corporation, Woburn, Mass.

[21] Appl. No.: 265,310

[22] Filed: Oct. 25, 1988

Related U.S. Application Data

[63] Continuation of Ser. No. 111,779, Oct. 21, 1987, abandoned.

[51] Int. Cl.$^4$ ............................................. G01M 7/00
[52] U.S. Cl. ...................................................... 73/663
[58] Field of Search ................. 73/662, 663, 664, 665, 73/666, 667, 668

[56] References Cited

U.S. PATENT DOCUMENTS 3,712,120  1/1973  Fletcher et al. ...................... 73/663

FOREIGN PATENT DOCUMENTS 2180945  4/1987  United Kingdom ................... 73/663

Primary Examiner—John Chapman
Attorney, Agent, or Firm—Schiller, Pandiscio & Kusmer

[57] ABSTRACT

A vibration test fixture system for use with a conventional shaker table. The fixture system includes a cube fixture for supporting an object to be tested and a head expander for supporting the cube fixture and for providing a mechanical and vibration transmissive connection between the cube fixture and the shaker table. The fixture system also includes an index mechanism for automatically repositioning the cube fixture relative to the head expander so that the object may be vibration tested along mutually orthogonal axes of the object.

26 Claims, 12 Drawing Sheets

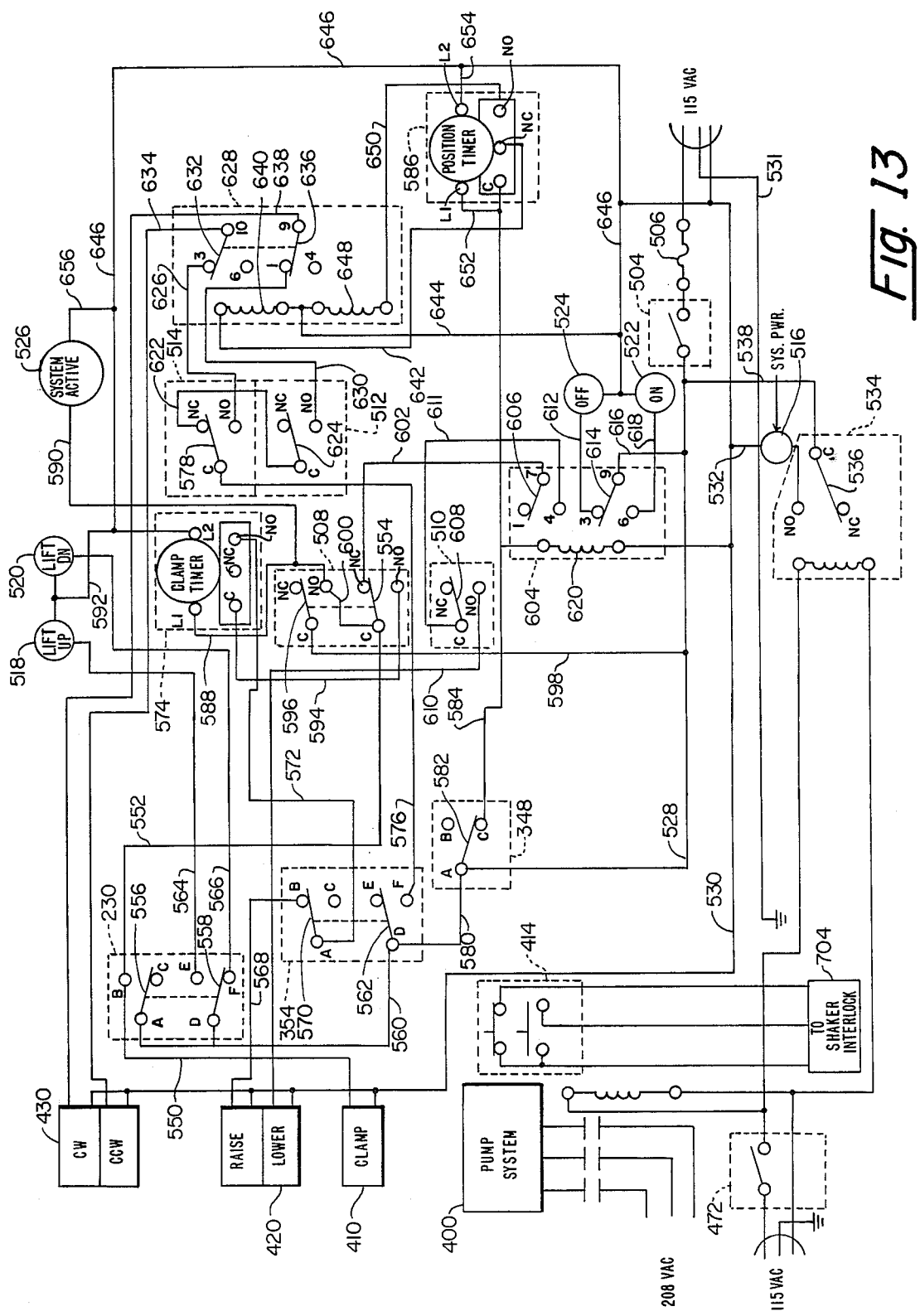

MULTI-AXIS TEST FIXTURE SYSTEM

This is a continuation of application Ser. No. 111,779, filed Oct. 21, 1987, now abandoned.

FIELD OF THE INVENTION

The present invention pertains to devices for vibration testing selected objects, and more particularly to fixtures for supporting an object to be vibration tested.

BACKGROUND OF THE INVENTION

Frequently, in the development of commercial or military products, it is desired to test the product's tolerance to sine vibration of selected frequency and amplitude or to random vibration with multi-frequency content. Conventional apparatus for performing this vibration testing include a vibration generator for generating vibration and a sliptable coupled to the vibration generator for supporting the object to be tested. Known vibration testing apparatus also typically include clamp fixtures for securing the test object to the sliptable or directly to the vibration generator.

In the past, to test an object's tolerance to vibration along more than one axis, the object was unclamped from the sliptable, repositioned, and clamped again to the sliptable or to the vibration generator in a new angular orientation therewith. This unclamping and repositioning was repeated for each axis of the object along which vibration testing was to be performed.

To minimize the time and effort required to reposition an object when multi-axis testing of the object is to be performed, a three-axis vibration test fixture of the type disclosed in British Patent Application No. 8522501, filed Sept. 11, 1985, was developed. This test fixture includes a cube to which a test object(s) is(are) secured and a clamp assembly for securing the cube to a vibrating table or head expander. A shaft is attached to one corner of the cube so as to diagonally extend along an axis that intersects the center and opposite corners of the cube. When it is desired to reposition the test object for vibration testing along a different axis of the object, the clamping assembly is actuated to release the cube. Then, the cube is repositioned by manipulating the shaft either manually or mechanically using an electric motor until the cube is in the desired new position. Thereafter, the cube is reclamped to the vibrating table.

While the invention of British Patent Application No. 8522501 reduces somewhat the amount of time required to test an object, especially an awkwardly-shaped object, significant time and human involvement is still required to reposition the object for testing along more than one axis of the object.

OBJECTS AND SUMMARY OF THE INVENTION

A primary object of the present invention is to provide a fixture system for supporting and automatically repositioning an object to be vibration tested so that the object can be quickly and easily subjected to vibration along three mutually-orthogonal axes of the object.

Another object of the present invention is to provide a fixture system for use with a conventional shaker table in which a test object is automatically repositioned relative to the shaker table so that vibration can be applied along different axes of the object.

These and other objects are achieved by a vibration test fixture system including a cubic fixture for supporting an object to be tested, a head expander for supporting the cubic fixture, and an index mechanism attached to the head expander and cubic fixture for repositioning the cubic fixture so that the object can be vibration tested in three different axes. The cubic structure is hollow and has five sides, the outer surfaces of two of which can be used to support the test object. One side of the cubic fixture is open so as to provide access to the interior of the fixture. A test object can also be secured across the front surface of the fixture. The test object may be secured to any one of the five inside surfaces of the cubic fixture, or to a track assembly positioned adjacent the middle of the cubic fixture. The head expander provides a mechanical and vibration transmissive connection between the shaker table and the cubic fixture, and provides a planar surface to which the cubic fixture is secured during vibration testing. The index mechanism includes a shaft secured to one corner of the cubic fixture and a drive assembly for rotating the shaft, and cubic structure secured thereto, about the longitudinal axis of the shaft and about an axis that extends normally to the longitudinal axis of the shaft.

In use, the head expander is secured to a conventional shaker table which provides vibration of selected amplitude and frequency and/or random vibration along an axis extending normally to the planar surface of the head expander. When it is desired to subject the test object to vibration along another axis of the object, the index mechanism pivotally moves the cubic fixture away from the head expander, rotates the fixture 120 degrees about a diagonal axis extending through opposite corners of the cube fixture, so as to reposition the fixture by 90 degrees, and pivotally moves the cubic fixture back into engagement with the expander head so that another surface of the cubic fixture engages the top surface of the head expander.

A control system is provided for controlling the operation of the index mechanism so as to permit automatic sequential repositioning of the cubic fixture in three mutually-orthogonal positions. Safety interlocks are included in the control system for preventing manipulation of the cubic structure or application of vibration when certain conditions have not been satisfied.

BRIEF DESCRIPTION OF THE DRAWINGS

For a fuller understanding of the nature and objects of the present invention, reference should be had to the following detailed description taken in connection with the accompanying drawings wherein:

FIG. 13 is a circuit diagram of the control system.

DETAILED DESCRIPTION OF THE INVENTION

Figure 1:
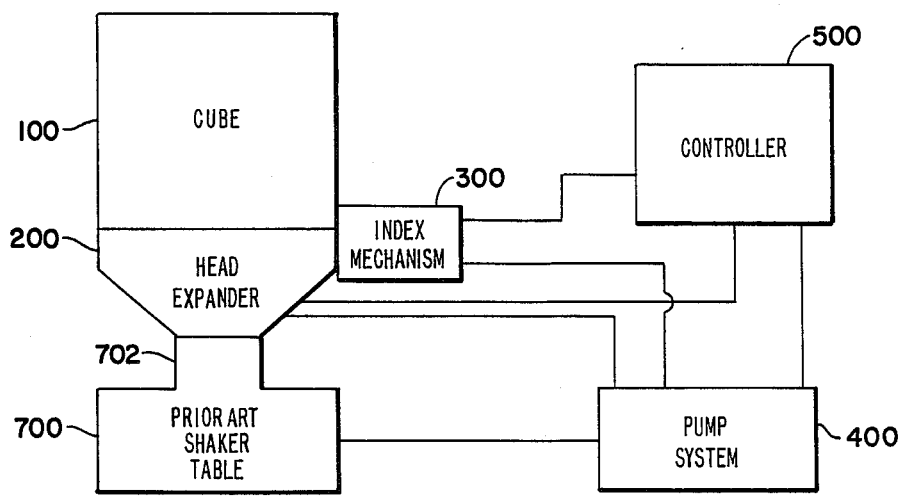
FIG. 1 is a schematic diagram of the vibration test.

Referring to FIG. 1, the present vibration test fixture system comprises cube fixture 100, head expander assembly 200, index mechanism 300, pump system 400 and controller 500. Vibration of selected amplitude and frequency is imparted to cube fixture 100 via head expander 200 from a prior art shaker table 700.

Figure 2:
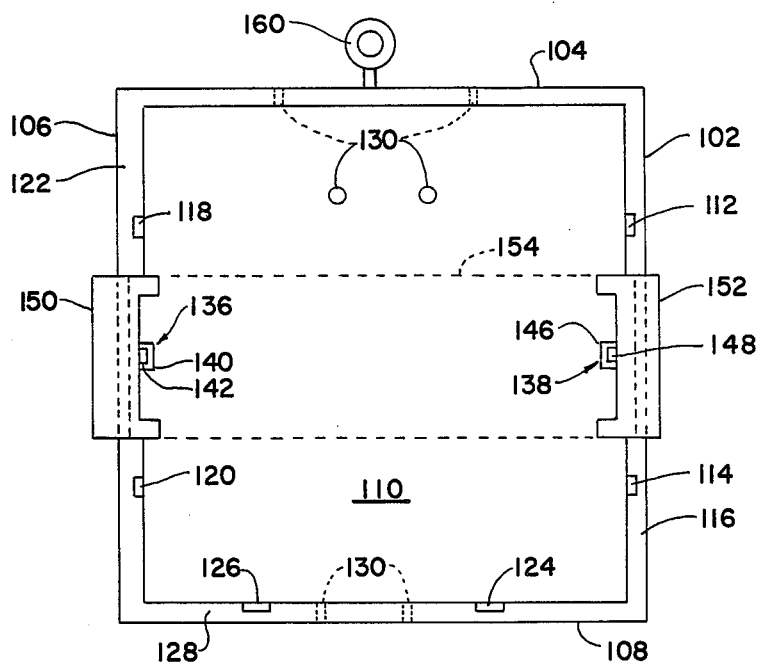
FIG. 2 is a front elevation of the cube fixture and head expander of the present invention.
Figure 3:
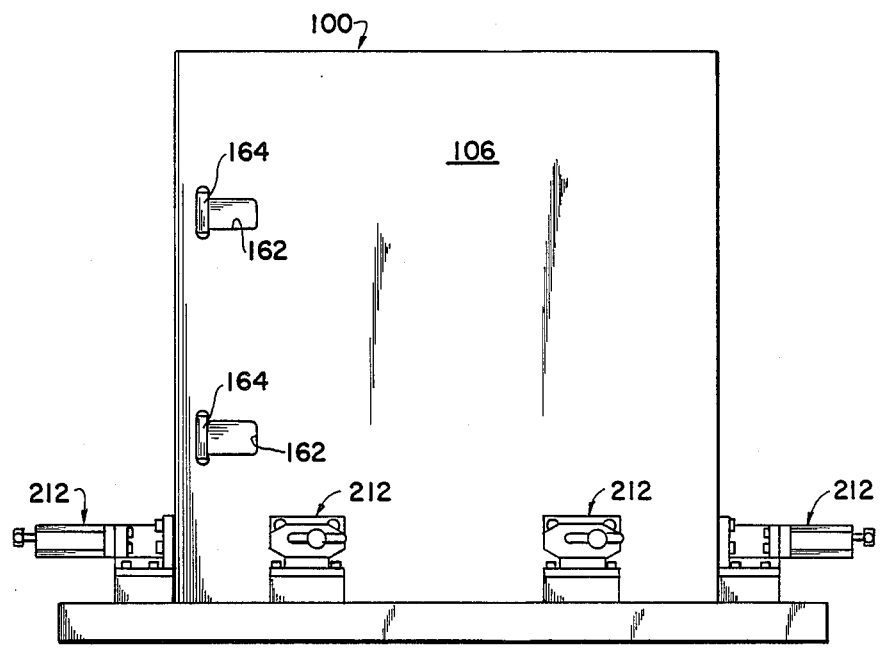
FIG. 3 is a side elevation of the cube fixture and a portion of the head expander.

Referring next to FIGS. 1–3, cube fixture 100 comprises first sidewall 102, second sidewall 104, third sidewall 106, fourth sidewall 108 and fifth sidewall 110. No sidewall is provided in the front of cube fixture 100 (as viewed in FIG. 2) opposite fifth sidewall 110. The outer surfaces of sidewalls 102–110 are substantially planar. Sidewalls 102–110 are substantially identical in size and are preferably square so that when the sidewalls are secured together, as illustrated in FIGS. 1–3, a cube is formed. Preferably, cube fixture 100 is fabricated from approximately one-inch thick magnesium plate, although other materials providing similar strength and rigidity may be satisfactorily employed. The thickness of the magnesium plate will vary with the size of the cube, with thicker plate being required for a larger cube and thinner plate for a smaller cube.

Hardened inserts 112 and 114 are provided in front edge 116 of sidewall 102. Hardened inserts 118 and 120 are provided in front edge 122 of sidewall 106. Hardened inserts 124 and 126 are provided in front edge 128 of sidewall 108. As described hereinafter, inserts 112, 114, 118, 120, 124 and 126 are positioned adjacent clamps 212 used to secure the cube fixture 100 to expander head 200. These inserts provide a hard surface which the clamp arm of the clamp engage, as noted below.

Identical apertures 130 (FIG. 2) are provided in sidewalls 102–110 for use in securing an object to be tested (not shown) to either the inner or outer surfaces of the sidewalls. The arrangement and number of apertures 130 will vary depending upon the configuration of the object to be tested. Apertures 130 may be threaded for securing a test object by screws to the sidewalls of cube fixture 100 or may be smooth for securing a test object by nut and bolt to the cube fixture sidewalls.

Figure 4:
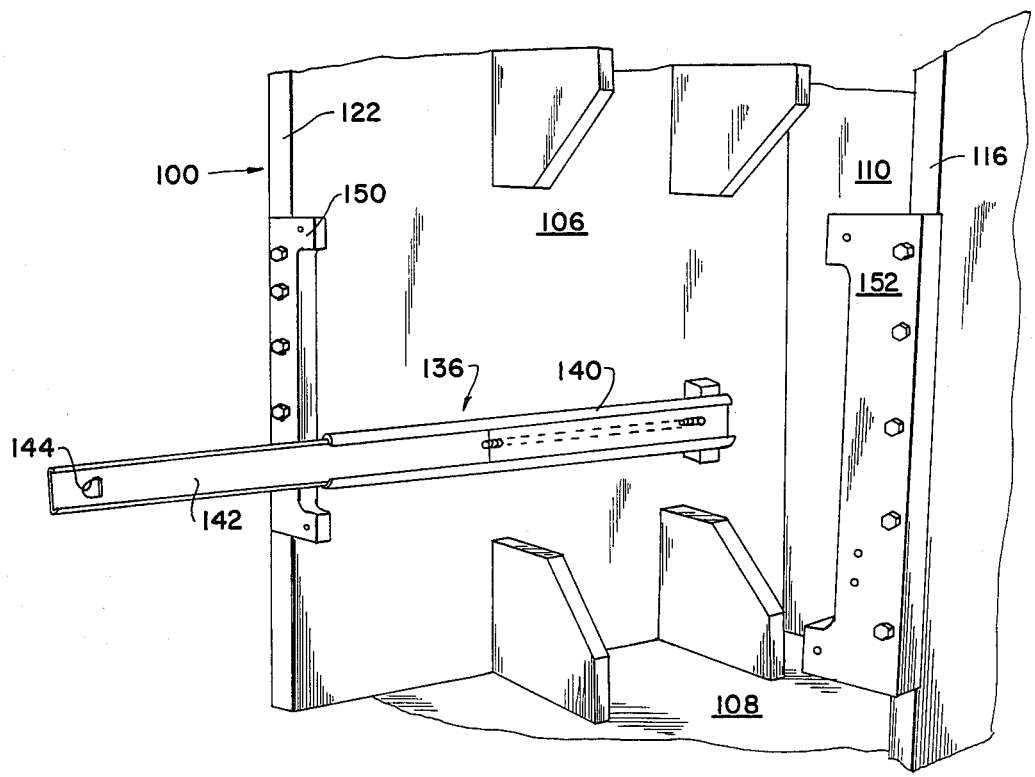
FIG. 4 is a perspective view of a portion of the interior of the cube fixture.

Referring next to FIGS. 2 and 4, track assemblies 136 (FIGS. 2 and 4) and 138 (FIG. 2) secured to the inside surfaces of sidewalls 102 and 106, respectively, are provided as an alternative means for attaching a test object to cube fixture 100. Track assemblies 136 and 138 are the mirror image of one another and are conventional slide track assemblies of the type used to slidably support a door in a desk or kitchen cabinet. Track assembly 136 includes outer track 140 and inner track 142. Outer track 140 is secured to the inner surface of sidewall 106, preferably midway between sidewalls 104 and 108, so as to extend in parallel with the inner surfaces of sidewalls 104 and 108. Outer track 140 slidably supports inner track 142. The former is provided for supporting a test object. Aperture 144 is provided in inner track 142 for receiving a bolt, turnkey or other suitable fastener, by which the test object can be secured to inner track 142. The length of track assembly 136 is selected so that when inner track 142 is slid out to its fully-extended position, a test object can be secured thereto without reaching into cube fixture 100.

Track assembly 138 is positioned opposite and extends along the same plane as track assembly 136. Track assembly 138 comprises outer track 146 and inner track 148 with an aperture (not shown) being provided in inner track 148 for securing a test object thereto. In general, a test object is simultaneously attached to inner tracks 142 and 148.

Plates 150 and 152 are secured to front surfaces 122 and 116, respectively adjacent track assemblies 136 and 138 respectively. Cover plate 154 (FIG. 2) is releasably securable to plates 150 and 152 using conventional fasteners (not shown), such as set screws, that are sized for receipt in threaded apertures (not shown) in plates 150 and 152. Cover plate 154 is provided for preventing inner tracks 152 and 148, and a test object secured thereto, from sliding out of the interior of cube fixture 100.

Eyebolt 160 is attached to sidewall 104 for use in lifting cube fixture 100 off head expander 200 during installation or servicing of the present vibration test fixture system or to remove the entire assembly from the shaker table. Due to the geometry of the cube fixture and the index mechanism for rotating the cube fixture, sidewall 104 can never be positioned to rest on head expander 200.

Four notches 162 (FIG. 3) are provided in the outer surface of sidewall 106. These notches are of selected depth and are positioned in selected locations adjacent the outer edges of sidewall 106, as described in greater detail hereinafter. Hardened insert plates 164 are provided in each notch 162 at the edges of the notches closest to the outer edges of the sidewall adjacent to which the notches are positioned. Correspondingly sized and positioned notches 162 (not shown) are also provided in sidewalls 102, 104, 108 and 110.

Figure 5:
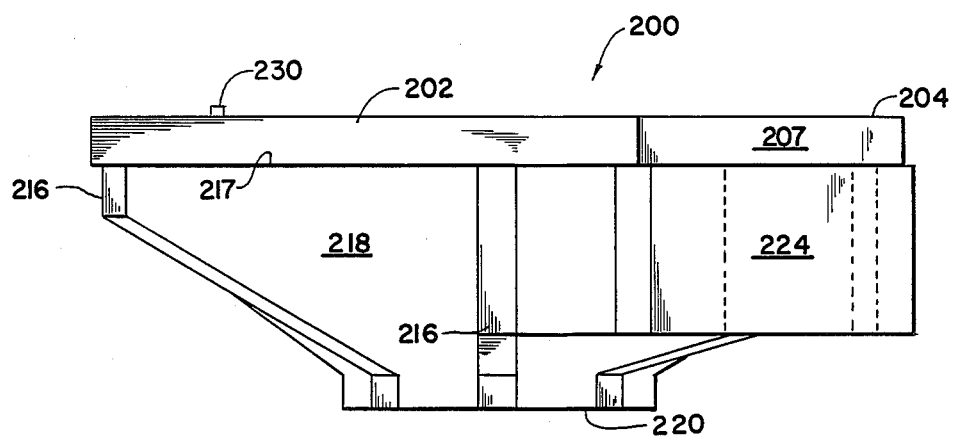
FIG. 5 is a side elevation of the head expander.
Figure 6:
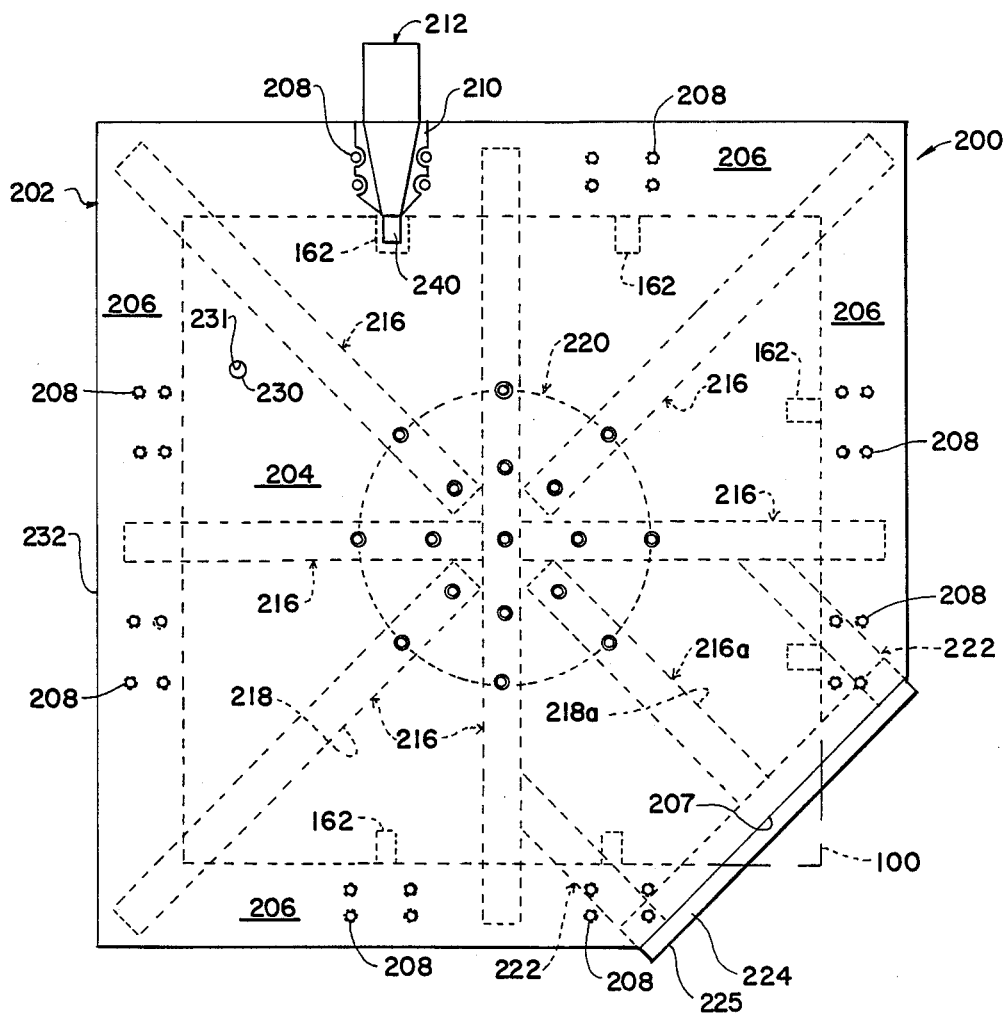
FIG. 6 is a plan view of the head expander, with the legs of the head expander shown in phantom.

Referring next to FIGS. 5 and 6, head expander 200 comprises top plate 202 having a substantially planar top surface 204. Top plate 202 is slightly larger than sidewalls 102–110, the latter being substantially identically sized as noted above, so that when cube fixture 100 is positioned on top surface 204, a peripheral portion 206 of the top surface will remain exposed. A rear corner of top plate 202 is removed so as to create an outer edge 207 that forms about a 45° angle with adjacent outer edges of the top plate.

A plurality of threaded apertures 208 are provided in groups of four in top plate 202 adjacent the outer edges of the latter in peripheral portions 206. Individual apertures 208 in each group of four apertures are positioned relative to one another so as to correspond to the placement of openings 210 (FIG. 6) of hydraulic clamps 212 (only one of which is shown). As described in greater detail hereinafter, the latter are clamps of the type disclosed in U.S. Pat. No. 3,724,837, which is incorporated herein by reference. The various groups of four apertures 208 are also positioned so that when cube fixture 100 rests on top plate 202, a group of four apertures is positioned adjacent each notch 162.

Figure 1A:
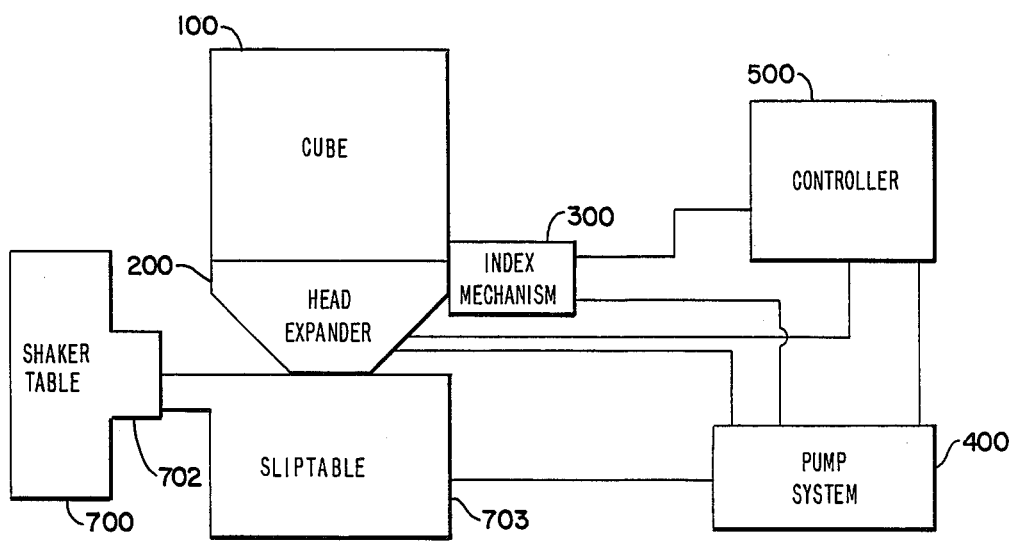
FIG. 1a is a schematic diagram of another embodiment of the present invention.

Alternatively, bottom surface 220 can be configured for mounting on a conventional sliptable 703, as illustrated in FIG. 1a. When head expander 200 and cube fixture 100 are supported on a sliptable 703, vibration is applied along an axis extending in parallel with top surface 204. Vibration transmitted by the sliptable 703 may be applied along three mutually-orthogonal axes of the test object by raising and rotating the cube fixture in the same manner as when the head expander is attached to the head of a shaker table, as described below.

Head expander 200 also comprises a plurality of radially-extending legs 216. Typically, legs 216 are made from flat stock of the type used to fabricate top plate 202, and leg top edges 217 are secured to the top plate so that leg sides 218 (FIG. 5) extend substantially normally to top surface 204. Leg sides 218 extend radially outwardly from a position at or near the center of the top plate 202 to a position adjacent the outer edges of the top plate. Leg 216a terminates adjacent outer edge 207, and therefore is shorter than the other legs 216. Legs 216 taper radially inwardly from top edge 217 to leg bottom surface 220 (FIG. 5).

Referring to FIGS. 1, 5 and 6, the bottom surface 220 is preferably configured to be readily mountable in conventional manner to the shaker head 702 (FIG. 1) of a conventional shaker table 700 of the type manufactured by Unholtz-Dickie corporation of Wallingford, Conn. and identified by model no. T-1000. Shaker table 700 generates vibration along an axis extending normally to the top surface of shaker head 702 with the result that vibration is applied along an axis extending normally to head expander top surface 204 when the head expander is secured to the shaker table.

Head expander 200 further comprises secondary legs 222 which are substantially identical to legs 216, except that the former extend (a) normally to outer edge 207, and (b) extend between a position adjacent outer edge 207 and ones of legs 216 adjacent edge 207, to which legs 216 and secondary legs 222 are attached. Index mechanism mounting plate 224 is attached to the outer edges of leg 216a and secondary legs 222 so that its mounting surface 225 extends in parallel with outer edge 207 and normally to top surface 204 and side surface 218a (FIG. 6) of leg 216a.

A lift microswitch 230 of the type manufactured by Microswitch Company of Atlanta, Ga. and identified by model no. 1EN75-R3, is secured in an aperture 231 (FIG. 6) in top plate 202. Aperture 231 is positioned adjacent the plate front edge 232 but just inside of peripheral portion 206, so that when cube fixture 100 rests on top plate 202, the microswitch will be depressed. Microswitch 230 is connected to controller 500, as described hereinafter, and is provided for detecting whether or not cube fixture 100 is resting on top surface 204.

Figure 7:
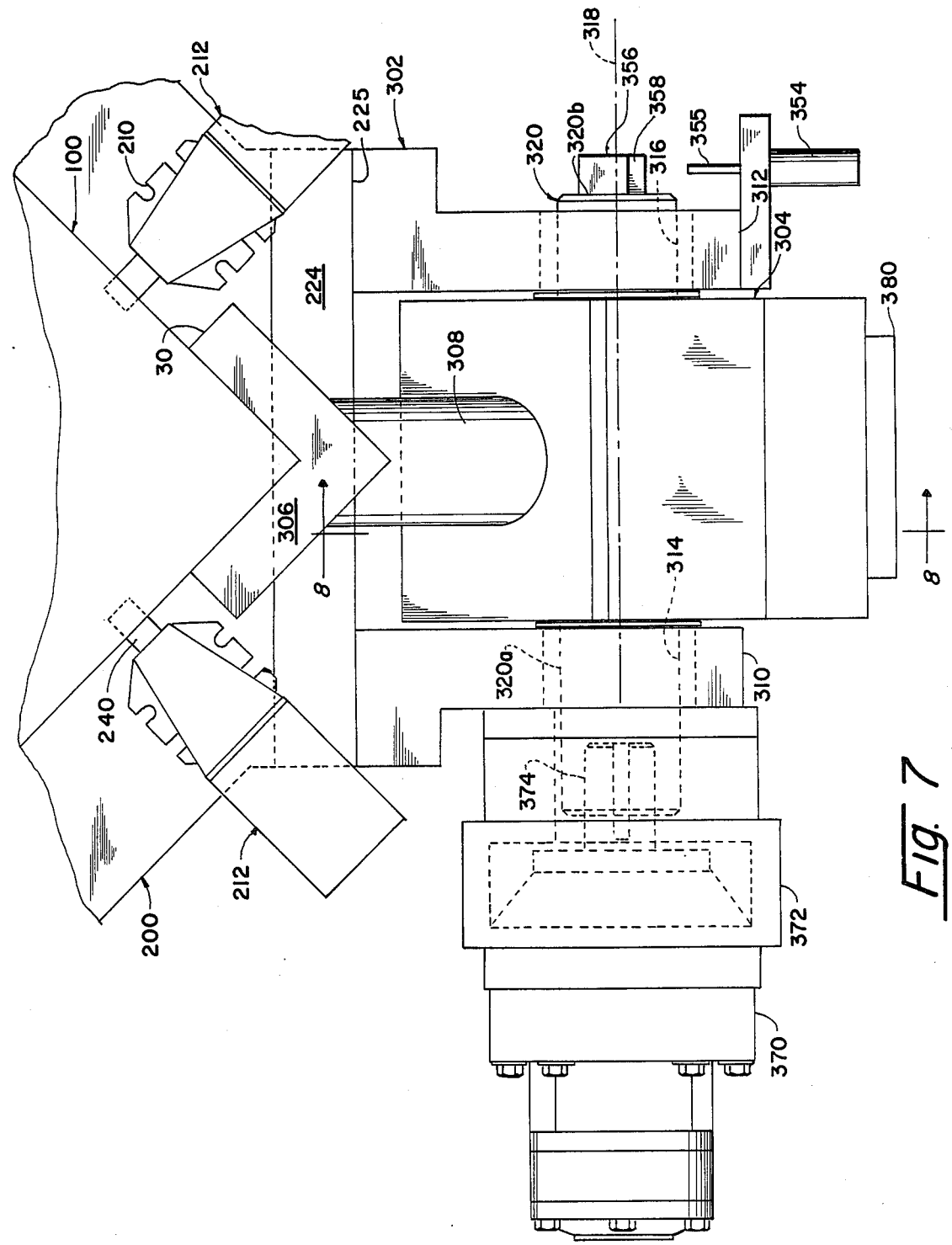
FIG. 7 is a plan view of the index mechanism and portions of the head expander and cube mechanism.

Referring now to FIGS. 5–7, a hydraulic clamp 212 is secured to top plate 202 at each group of four apertures 208 by conventional threaded fasteners. Clamps 212 are provided for securing cube fixture 100 to top plate 202. Clamps 212 comprise a clamping arm 240 (FIGS. 6 and 7) that extends outwardly and then downwardly from the clamp when the clamp is actuated. Notches 162 and hardened inserts 112, 114, 118, 120, 124, and 126, are each positioned and sized to receive the clamping arm 240 of a clamp 212 when the arm is actuated so as to extend forwardly and downwardly. By such actuation, the clamping arm 240 engages hard insert 154 in the base of notch 162, and inserts 112, 114, 118, 120, 124 and 128, so as to force cube fixture 100 against top plate 204, and thereby clamp the cube fixture to the head expander 200.

Clamps 212 are single-action, spring return clamps. Clamping arm 240 is extended when pressurized fluid is supplied to the clamp and is retracted under the force of the clamp's return spring when pressurized fluid is not supplied. Each clamp 212 is coupled to and actuated by pump system 400, as described hereinafter.

Referring next to FIGS. 7–10, index mechanism 300 is provided for raising cube fixture 100 off head expander 200, rotating the cube fixture, and lowering the cube fixture back onto the head expander, whereby a different one of sidewalls 102, 108 or 110 engages top surface 204. Index mechanism 300 is a double-axis positioning mechanism comprising yoke bracket 302, block 304, corner bracket 306, and shaft 308. Yoke bracket 302 is attached to head expander mounting bracket 224 and comprises legs 310 and 312 which extend away from and normal to mounting surface 225. Legs 310 and 312 are spaced apart so that block 304 may be received therebetween. Circular apertures 314 (FIG. 8) and 316 (FIG. 7) extend through legs 310 and 312, respectively, and are formed and positioned so that a transverse axis 318 (FIG. 7) extending through the center of the circular apertures extends in parallel with head expander top surface 204 and mounting bracket surface 225. Split-axle 320 is rotatably supported by suitable means (not shown) in yoke bracket 302. Split-axle 320 comprises stub axle 320a that extends through and is rotatably supported in aperture 314 and stub-axle 320b that extends through and is rotatably supported in aperture 316. Split-axle 320 is thus mounted in yoke bracket 302 for rotation about transverse axis 318.

Figure 8:
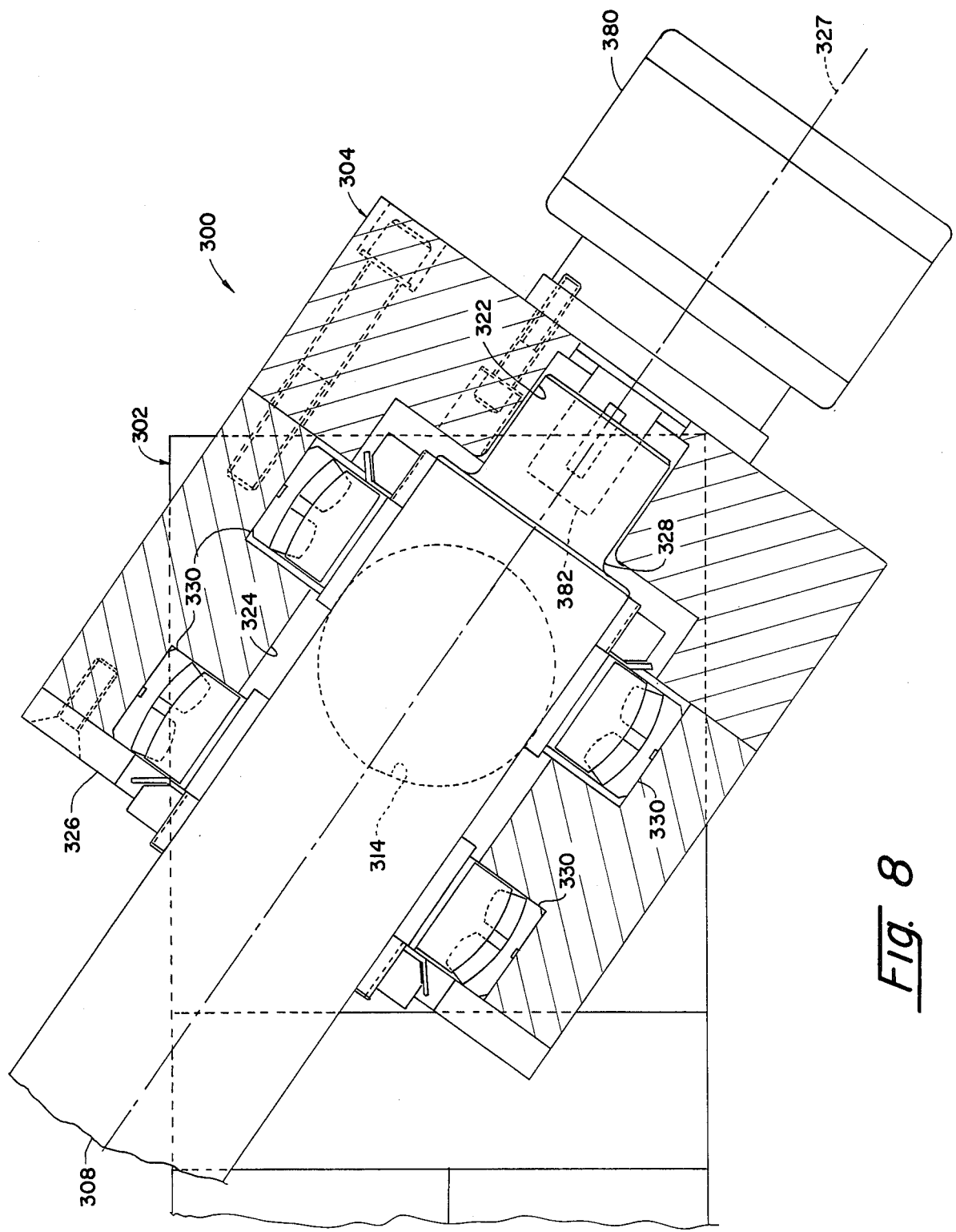
FIG. 8 is a partial cross-sectional side elevation of the index mechanism, taken along line 8—8 in FIG. 7, with one leg of the yoke bracket being shown in phantom.

Block 304 is secured to axle 320 for rotation therewith, and is thereby supported in yoke bracket 302 for pivotal movement about transverse axis 318. Block 304 includes bore 322 and counterbore 324 which extend through the center of the block normally to block front face 326 along diagonal axis 327 (FIG. 8). Counterbore 324 is sized to receive shaft 308 and bore 322 is sized to receive shaft extension 328 secured to the distal end of the shaft. Bearing assemblies 330 (FIG. 8) are disposed inside block 304 for rotatably supporting shaft 308 within counterbore 324 for rotation about diagonal axis 327.

Corner bracket 306 is secured to sidewalls 102 and 110 adjacent the corner of cube fixture 100 formed at the intersection of sidewalls 102, 108 and 110.

The proximal end of shaft 308 is secured to corner bracket 306, and therefore to cube fixture 100, so as to extend along an axis that intersects (a) the center of cube fixture 100 and (b) the two opposite corners of the cube fixture formed at the intersection of (i) sidewalls 102, 108 and 110, and (ii) sidewalls 104, 106, and the plane extending along the open front of the cube fixture, respectively. This axis is coaxial and coincident with diagonal axis 327.

Figure 9:
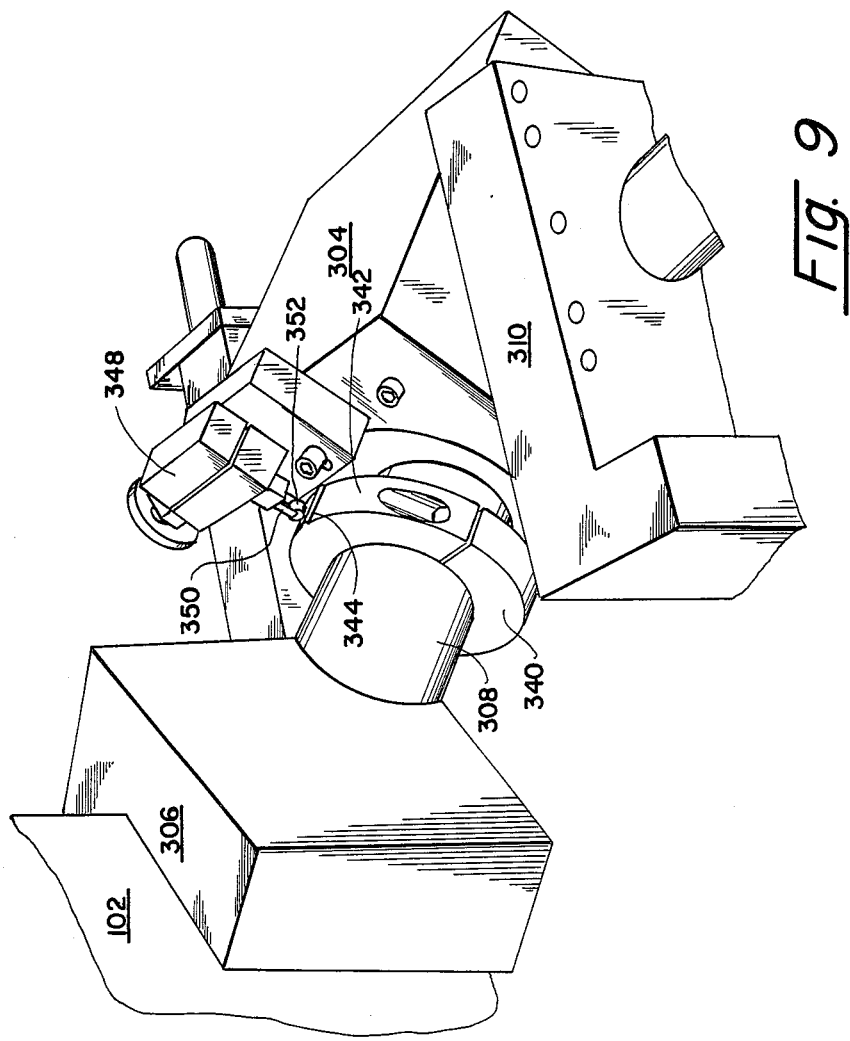
FIG. 9 is a perspective view of portions of the index mechanism, the head expander and the cube fixture.

As best seen in FIG. 9, collar 340 is attached to that portion of shaft 308 extending between block 304 and corner bracket 306. Collar 340 includes a smooth, circular peripheral surface 342. Three protrusions 344 are provided on collar 340 extending slightly above peripheral surface 342. Protrusions 344 are evenly spaced at 120° increments on peripheral surface 342.

Index mechanism further comprises rotation microswitch 348 for detecting the rotational position of shaft 308, and thus cube fixture 100 attached thereto, about diagonal axis 327. A suitable microswitch 348 is manufactured by Microswitch Company and is identified by model no. 1EN75-R3. Switch 348 is connected to controller 500, as described hereinafter. Microswitch 348 includes piston 350 which is mounted for reciprocal movement into and out of the body of the switch, and wheel 352 mounted at the distal end of piston 350 for rotational movement. Piston 350 is urged out of the body of microswitch 348 by conventional biasing means (not shown). Microswitch 348 is mounted to block 304 above collar 340 so that when wheel 352 is urged into engagement with peripheral surface 342, the wheel will roll along the peripheral surface. Switch 348 is also positioned so that the axis along which piston 350 reciprocates extends normally to diagonal axis 327.

By this configuration and positioning of switch 348, shaft 308, and collar 340 attached thereto, are rotated about diagonal axis 327, as described hereinafter, and wheel 352 slides along peripheral surface 342. When a protrusion 344 is encountered, wheel 352 and piston 350 are urged upwardly slightly, thereby causing the piston to momentarily close a contact (not shown) inside switch 348. This contact is momentarily closed each time shaft 308 rotates through a 120° arc about diagonal axis 327.

Figure 10:
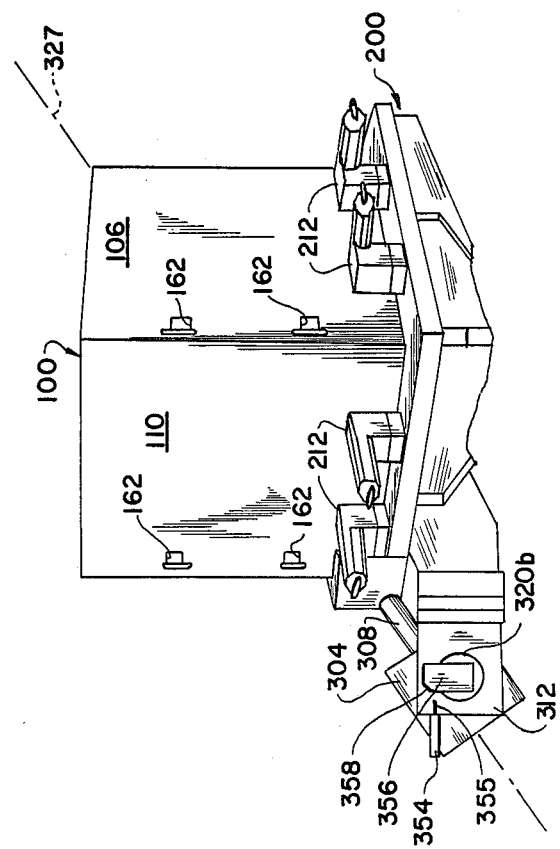
FIG. 10 is a side elevation of the index mechanism and a perspective view of the cube fixture and head expander.
Figure 10A:
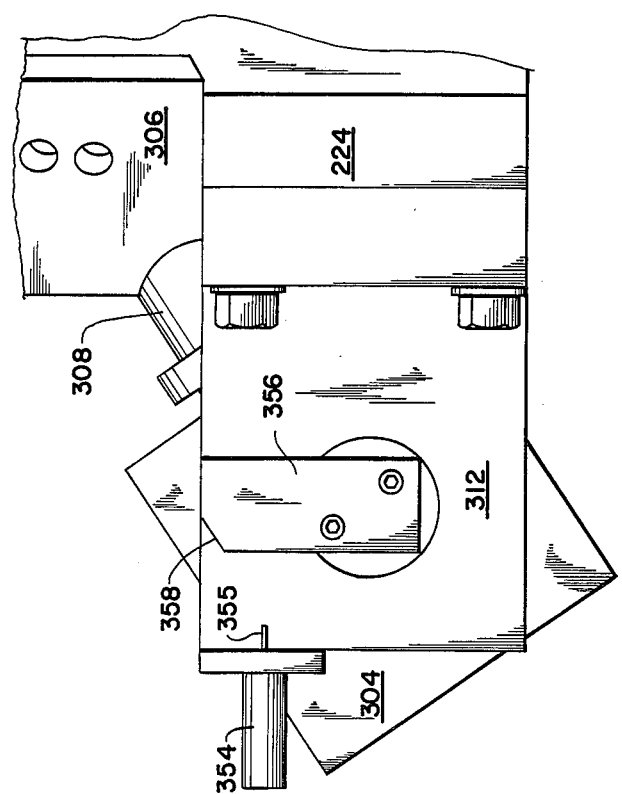
FIG. 10a is a side elevation of the index mechanism and a portion of the head expander.

Referring now to FIGS. 7, 10 and 10a, position microswitch 354 is provided for detecting when block 304 has been rotated through a selected arc about transverse axis 318. A suitable microswitch 354 is manufactured by Microswitch Company of Atlanta, Ga., and is identified by model no. BZE62RQ8. Position microswitch 354 is attached to yoke bracket leg 312, and connected to controller 500 as described hereinafter. Microswitch 354 includes piston 355 which is mounted for reciprocal movement inside the body of microswitch 354. Piston 355 is normally biased outwardly, and is connected to a contact or wiper (not shown) inside the microswitch which the piston trips when urged into the microswitch. Trip arm 356 is attached to the end of stub axle 320b adjacent leg 312 for rotational movement with the axle. Cam surface 358 is provided at one corner of trip arm 356. Trip arm 356 is sized and microswitch 354 is positioned so that when axle 320 is rotated through a selected arc about transverse axis 318, as described hereinafter, trip arm cam surface 358 engages and depresses microswitch piston 355, closing the contact inside the microswitch.

Referring next to FIG. 7, a conventional, two-way hydraulic motor 370 is provided for rotating axle 320, and block 304, shaft 308 and cube fixture 100 secured thereto, clockwise or counterclockwise about transverse axis 318. Hydraulic motor 370 is attached by bracket 372 to yoke bracket arm 310 so that motor drive shaft 374 is coaxially aligned with axle 320. Drive shaft 374 is keyed to axle 320 so that rotational drive can be transmitted from hydraulic motor 370 to the axle.

As best seen in FIG. 8, a second conventional two-way hydraulic motor 380 is provided for rotating shaft 308, and cube fixture 100, attached thereto, about diagonal axis 327. Hydraulic motor 380 is attached to block 304 so that its drive shaft 382 is coaxially aligned with shaft 308. Drive shaft 382 is keyed to shaft extension 328 so that rotational drive can be transmitted from hydraulic motor 380 to shaft 308.

Figure 11:
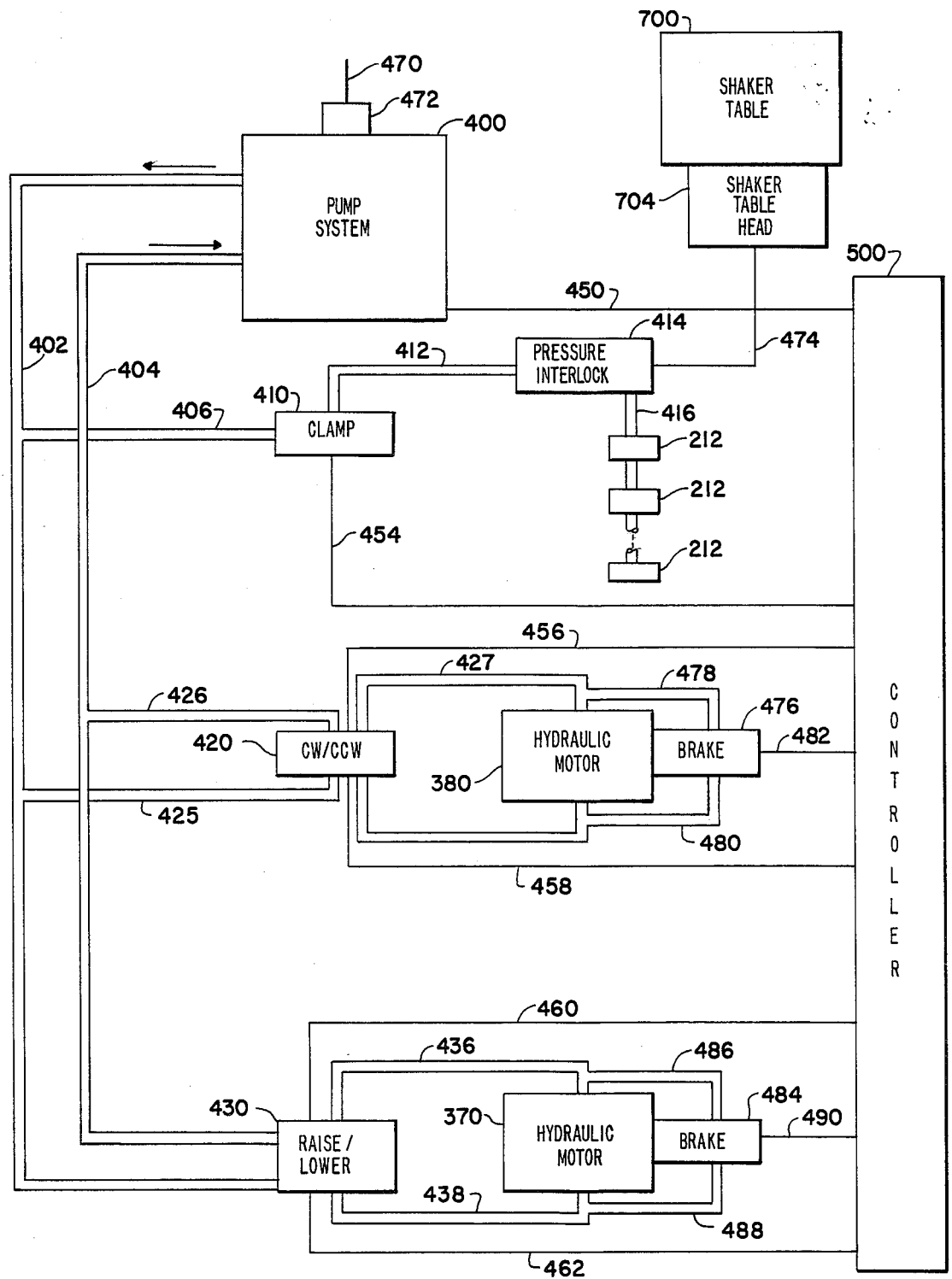
FIG. 11 is a schematic diagram of the hydraulic system and control system of the present invention.

Referring now to FIG. 11, pump system 400 comprises a conventional hydraulic pump (not shown) and related devices (not shown), such as a pressure regulator, for supplying hydraulic fluid at suitable pressure to hydraulic motors 370 and 380, and to various solenoids as described below Hydraulic fluid is supplied from pump system 400 over line 402 and is returned to the pump system over line 404. Hydraulic fluid is supplied over line 406 to clamp solenoid valve 410. The latter is a conventional one-way solenoid valve that allows fluid to pass when open and blocks the passage of fluid when closed. Clamp solenoid valve 410 opens when the supply of power thereto is cut off, and closes when coupled with power. Clamp solenoid valve 410 is connected by hydraulic line 412 to pressure interlock 414, which is hydraulically connected over line 416 to each of hydraulic clamps 212. Pressure interlock 414 is provided for determining whether or not pressurized hydraulic fluid is being supplied to clamps 212. Because clamps 212 are single-action, spring return clamps i.e., they clamp when hydraulic pressure is supplied and retract under the force of an internal spring when hydraulic pressure is cut off, the hydraulic circuit line to which the clamps are attached is a dead-end circuit. As such, no return line is provided for coupling clamp solenoid valve 410 with return line 404.

Clockwise (CW)/counter-clockwise (CCW) solenoid 420 receives pressurized hydraulic fluid from line 402 over line 425. Fluid is returned from CW/CCW solenoid 420 to line 404 over line 426. CW/CCW solenoid valve 420 is a conventional, two-way solenoid valve and is connected over lines 427 and 428 to hydraulic motor 380 so that pressurized fluid may be supplied in either direction to the hydraulic motor. When the CW path is opened in by actuating the CW relay in solenoid valve 420, as described hereinafter, pressurized fluid is delivered to hydraulic motor 380 over line 427 and is returned form the motor over line 428 causing the motor, and shaft 308 and cube fixture 100 attached thereto, to rotate in a clockwise direction about diagonal axis 327. When the CCW path is opened by actuating the ccw relay in solenoid valve 420, as described hereinafter, pressurized fluid is delivered to hydraulic motor 380 over line 428 and is returned from the motor over line 427, causing the motor, and shaft 308 and cube fixture 100 attached thereto, to rotate in a counterclockwise direction about diagonal axis 327.

Raise/lower solenoid valve 430 receives pressurized fluid directly over line 402 and returns fluid directly to line 404. Raise/lower solenoid valve 430 is a conventional two-way solenoid valve and is connected over lines 436 and 438 to hydraulic motor 370, so that pressurized fluid :ay be supplied in either direction to the hydraulic motor. When the raise path is opened by actuating the raise relay in solenoid valve 430, as described hereinafter, pressurized fluid is delivered to hydraulic motor 370 over line 436 causing the motor, and axle 320, shaft 308 and cube fixture 100 attached thereto, to rotate in a clockwise direction about transverse axis 318, whereby cube fixture 100 is raised off head expander 200. When the lower path is opened by actuating the lower relay of solenoid 434, as described hereinafter, fluid is supplied over line 438 to hydraulic motor 370 and is returned over line 436, causing the hydraulic motor to rotate in a counter-clockwise direction about transverse axis 318, whereby cube fixture 100 is lowered onto head expander 200.

Pump system is electrically connected over line 450 to controller 500. Clamp solenoid valve 410 is electrically connected over line 454 to controller 500. The CW relay (not shown) in CW/CWW solenoid valve 420 that opens the CW path is electrically connected over line 456 to controller 500. The CCW relay (not shown) in CW/CCW solenoid valve 420 that opens the CCW path is electrically connected over line 458 to controller 500. CW/CCW solenoid valve 420 also has a null mode that is activated when no power is supplied to the solenoid. In the null mode, fluid entering CW/CCW solenoid valve 420 over line 425 is immediately ported out over line 426 without entering lines 427 or 428. The raise relay (not shown) of raise/lower solenoid valve 430 that opens the raise path is electrically connected over line 460 to controller 500. The lower relay (not shown) of raise/lower solenoid valve 430 that opens the lower path is connected over line 462 to controller 500. Raise/lower solenoid valve 430 also contains a null mode in which no fluid is supplied to lines 436 and 438 which is activated when no power is supplied to the solenoid. Power is supplied to pump system 400 over line 470. Pump power switch 472 is connected between line 470 and pump system 400, and is provided for turning power on and off to the pump system.

Pressure interlock 414 is connected over line 474 to shaker table interlock 704. The latter is a conventional interlock system that prevents shaker table 700 from being operated when certain operating parameters are not satisfied. Pressure interlock is constructed so that when sufficient fluid pressure is supplied at clamps 212 to allow the latter to clamp cube fixture 100 to head expander 200, pressure interlock 414 will generate an able signal that is sent over line 474 to interlock system 704. The latter will permit shaker table 700 to operate only when this able signal is received.

Hydraulic motor brake 476 is attached to hydraulic motor 380 for locking the motor so as to prevent the latter from rotating. Brake 476 is connected to line 427 via line 478 and to line 428 via line 480, and is thereby able to detect if pressurized fluid is being supplied to hydraulic motor 380. When brake 476 no longer detects the supply of pressurized fluid to motor 380, it activates and locks the motor against further rotation. Brake 476 is connected over line 482 to controller 500. A suitable brake 476 is manufactured by Ausco Company, and is identified by model no. 34795.

Hydraulic motor brake 484 is attached to hydraulic motor 370 for locking the motor so as to prevent the latter from rotating. Brake 484 is connected to line 436 via line 486 and to line 438 via line 488, and is thereby able to detect if pressurized fluid is being supplied to hydraulic motor 370. When brake 484 no longer detects the supply of pressurized fluid to motor 370, it activates and locks the motor against further rotation. Brake 484 is connected over line 490 to controller 500. A suitable brake 484 is manufactured by Ausco Company, and is identified by model no. 34795.

Figure 12:
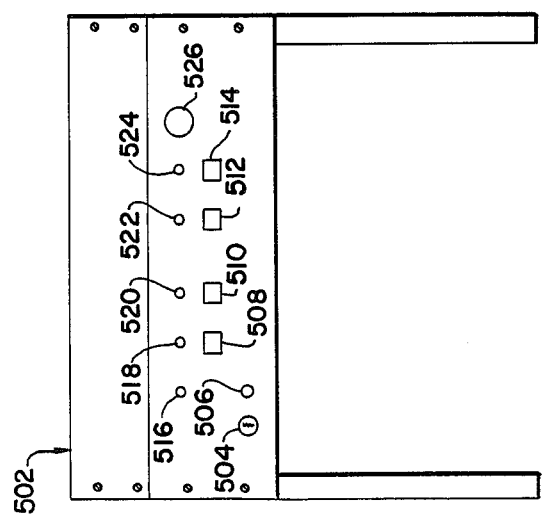
FIG. 12 is a front elevation of the control system.

Referring now to FIGS. 12 and 13, controller 500 comprises control panel 502 (FIG. 12) on which power-on switch 504, fuse 506, raise switch 508, lower switch 510, clockwise rotation switch ("CW switch") 512 and counter-clockwise rotation switch ("CCW switch") 514 are mounted. Also mounted on control panel 502 are system power light 516, lift up light 518, lift down light 520, on-axis light 522, off-axis light 524, and sound alert 526.

Power-on switch 504 is a single pole switch that is provided for connecting controller 500 to power. Fuse 506 is provided for protecting controller 500 from an excessive supply of power. Raise switch 508 is a double-pole, double-throw, normally-closed ("NC") switch. Lower switch 510 is a single-pole, single-throw, normally-closed switch. CW switch 512 is a single-pole, single-throw, normally-closed switch. CCW switch 514 is a single-pole, single-throw, normally-closed switch. Sound alert 526 is a conventional industrial warning sound generator.

Power is supplied to controller 500 over lines 528 and 530. Controller 500 is connected to ground via line 531. System power light 516 is connected via line 532 between line 530 and the normally-open ("NO") terminal of safety interlock switch 534. The latter is a conventional, normally-closed latching relay. The wiper 536 of interlock switch 534 is connected over line 538 to line 528. Pump power switch 472 is connected to the coil of interlock switch 534 so that when the pump power switch is closed, the coil will be actuated and wiper 536 will move to the other terminal of the interlock switch. When the interlock switch is energized in this manner, and when system power switch 504 is closed, lines 528 and 530 are connected with other elements in the controller, and system power light 516 is illuminated. Safety interlock switch 534 is provided for preventing the vibration test fixture system from being used except when both the controller system and the pump system have been activated.

Terminal B of the upper relay of lift microswitch 230 is connected over line 550 to clamp solenoid valve 410. Terminal B is also connected over line 552 to lower wiper 554 of raise switch 508. Terminal C of the upper relay of microswitch 230 is not connected to any other elements of controller 500. Wipers 556 and 558 of microswitch 230 are connected over line 560 to lower wiper 562 of position microswitch 354. Terminal E of the lower relay of lift microswitch 230 is connected over line 564 to lift up light 518. Terminal F of lower relay of lift microswitch 230 is connected over line 566 to lift down light 520.

Terminal B of the upper relay of position microswitch 354 is connected over line 568 to the raise relay of raise/lower solenoid valve 420 that opens the raise path of the solenoid. As noted above, when the raise path is opened, fluid is supplied to hydraulic motor 370 so as to cause the motor to raise cube fixture 100 off head expander 200. Terminal C of the upper relay of position microswitch 354 and terminal E of the lower relay of position microswitch 354 are not connected with any other elements of controller 500. Upper wiper 570 of microswitch 354 is connected over line 572 to the normally-open terminal of clamp timer 574. Terminal F of the lower relay of position microswitch 354 is connected over line 576 to the wiper 578 of CCW switch 514. Wiper 562 of microswitch 354 is connected over line 580 to wiper 582 of rotate microswitch 348. Wiper 582 is also connected to power line 528.

Terminal B of rotate microswitch 348 is not connected to any other element of controller 500. Terminal C of microswitch 348 is connected over line 584 to the L1 and C (closed) terminals of position timer 586.

Clamp timer 574 is a conventional timer that creates an open circuit between electrical elements connected to the timer for a selected period of time. Preferably, this selected time is slightly greater than the amount of time it takes the slowest one of clamps 212, after clamp solenoid valve 410 opens and supplies pressurized fluid to the clamp, to fully extend its clamping arm 240. The L1 terminal of clamp timer 574 is connected over line 588 to the normally open ("NO") terminal of the upper relay of raise switch 508. The L1 terminal of clamp timer 574 is also connected over line 588, via line 590 connected to line 588, to sound alert 526. The L2 terminal of clamp timer 574 is connected over line 592 to lift up light 518 and lift down light 520. The C terminal of clamp timer 574 is connected over line 594 to the NO terminal of the lower relay of raise switch 508. The NC terminal of clamp timer 574 is not connected to any other elements of controller 500.

The NC terminal of the upper relay of raise switch 508 is not connected to any other element of controller 500. Upper wiper 596 of switch 508 is connected over line 598 to power line 528. The NO terminal of the upper relay of switch 508 is connected over line 600 to lower wiper 554. The NC terminal of the lower wiper of switch 508 is connected over line 602 to the upper wiper 603 of latching relay 604. Lower wiper 554 is also connected over line 606 to the relay 608 of lower switch 510.

The NC terminal of lower switch 510 is not connected to any other element of controller 500. The NO terminal of switch 510 is connected over line 610 to lower relay of raise/lower solenoid valve 420 that opens the lower path of the solenoid.

As noted above, when the lower path is open, fluid is supplied to hydraulic motor 370 so as to cause to motor to lower cube fixture 100 onto head expander 200. Latching relay 604 is a conventional double-pole relay. Terminal 1 of the upper relay of latching relay 604 is not connected to any other elements of controller 500. Terminal 4 of the upper relay of latching relay 604 is connected over line 611 to line 606. Terminal 3 of the lower relay of latching relay 604 is connected over line 612 to off-axis light 524. Wiper 614 of the lower relay of latching relay is connected over line 616 to line 528. Terminal 6 of the lower relay of latching relay 604 is connected over line 618 to on-axis light 522. The coil 620 of latching relay 604 is connected between lines 584 and 530.

The NC terminal of CCW switch 514 is connected over line 622 to wiper 624 of CW switch 512. The NO terminal of CCW switch 514 is connected over line 626 to terminal 3 of the upper relay of latching relay 628.

The NC terminal of CW switch 512 is not connected to any other element of controller 500. The NO terminal of CW switch 512 is connected over line 630 to terminal 1 of the lower relay of latching relay 628.

The latter is a conventional double pole, double-throw latching relay. Terminals 4 and 6 of latching relay 628 are not connected to any other elements of controller 500. Upper wiper 632 of latching relay 628 is connected over line 634 to the CCW relay of CW/CCW solenoid valve 430 which opens the CCW path in the solenoid. As noted above, when the CCW path is open, fluid is supplied to hydraulic motor 380 so as to cause the motor to rotate cube fixture 100 is a counter-clockwise direction about diagonal axis 327. Lower wiper 636 is connected over line 638 to the CW relay of CW/CCW solenoid valve 430 which opens the CW path in the solenoid. As noted above, when the CW path is opened, fluid is supplied to the hydraulic motor 380 so as to cause the motor to rotate cube fixture 100 in a clockwise direction about diagonal axis 327. One terminal of upper coil 640 of latching relay 628 is connected over line 642 to the NC terminal of position timer 586. The other terminal of upper coil 640 is connected over line 644 to line 646 and is connected to one terminal of lower coil 648. The other terminal of lower coil 648 is connected over line 650 to the NO terminal of position timer 586.

The latter is a conventional timer that cuts off the flow of power to elements connected thereto for a selected period of time. Here, the selected period of time ranges from about 3 to 15 seconds, and is preferably about 5 seconds. The L1 terminal of position timer 586 is connected over line 652 to line 584. The L2 timer of position timer 586 is connected over line 654 to line 646. The latter line is connected over line 656 to the other terminal of sound alert 526, and is connected to line 592.

Referring to FIGS. 1–13, in the following description of the present invention, it is initially assumed that cube fixture 100 rests on head expander top surface 204 so as to depress the wipers 556 and 558 in lift microswitch 230 causing the wipers to engage, respectively, terminals C and F. It is also assumed that pump power switch 472 is open with the result that no pressurized hydraulic fluid is supplied to clamps 212 and thus the latter do not clamp cube fixture 100 to head expander 200. Shaker table 700 is assumed to be turned off. It is also assumed that wheel 352 (FIG. 9) is resting on protrusion 344, with the result that piston 350 has urged wiper 582 of microswitch 348 into contact with terminal C. As a result of this contact, power is supplied to coil 620 of latching relay 604 causing the latter to move wipers 603 and 614 into contact with terminals 4 and 6, respectively.

Before shaker table 700 is activated, expander head base 220 is secured to shaker head 702 by conventional means. Power is then supplied to the present system by closing system power switch 504. Next, pump power switch 472 is closed so as to connect pump system 400 to power. When both pump power switch 472 and system power switch 504 are closed, the interlock switch coil moves wiper 536 into contact with the NO terminal of the interlock switch, thereby illuminating system power light 516 and connecting the remainder of controller 500 to power.

When power is supplied to pump system 400, the latter begins supplying pressurized fluid to clamp solenoid valve 410. When cube fixture 100 rests on head expander top surface 204 so as to depress lift microswitch 230, wipers 556 and 558 thereof are urged into contact with associated terminals C and F, respectively, as noted above. In this position, no power is supplied to clamp solenoid valve 410 with the result that the latter opens permitting pressurized fluid to flow to clamps 212 over line 412 (FIG. 11) and 416 (FIG. 11) so as to cause the clamps to extend their clamp arms 240 (FIG. 6) into engagement with inserts 112, 114, 118, 120, 124 and 126 (FIG. 2) and/or notch inserts 164 (FIG. 3), as the case may be, so as to clamp cube fixture 100 to top plate 202. If the pressure supplied to clamps 212 is sufficient to permit the latter to securely clamp the cube fixture 100 to top plate 202, an able signal is supplied to shaker interlock 704 from pressure interlock 414. Upon receipt of this able signal shaker interlock 704 will permit shaker table 700 to be activated.

Next, a test object is secured to one of the five interior surfaces of the sidewalls of cube fixture 100, or to the exterior surfaces of sidewalls 102, 106, 108 or 110. Apertures 130 are provided for se in securing the object to one of the sidewalls. Of course, when a test object is secured to the outside surface of one of the sidewalls, that sidewall is never positioned to engage head expander 200.

Alternatively, a test object may be secured to cube fixture 100 using track assemblies 136 and 138 (FIGS. 2 and 4). This method of support is designed for test objects that (1) are sized to simultaneously engage inner tracks 142 and 148 and (2) include a locking fixture (not shown) sized for receipt in apertures 144 in inner tracks 142 and 148, for securing the test object to the inner tracks. Typically, inner tracks 142 and 148 are slid out of cube fixture 100 along outer tracks 140 and 146, respectively, and then the test object is secured to the inner tracks. Thereafter, the inner tracks 142 and 148, and test object secured thereto, are slid back into the cube fixture, and cover plate 154 is secured to plates 150 and 152 by suitable means. When secured in this manner, cover plate 154 prevents the inner tracks and test object from sliding out of cube fixture 100.

At this point, the test object is firmly supported in cube fixture 100 and the latter is secured to top plate 202. Mechanical vibration can now be transmitted to the test object by activating shaker table 700. Shaker table 700 is activated by a switch (not shown) on the shaker table, and not at control panel 502. Vibration is transmitted to the test object from shaker head 702 through head expander 200 along an axis extending normally to top surface 204. After the test object has been tested for a selected period of time, shaker table 700 is deactivated.

If it is desired to apply vibrations to the test object along an axis that is mutually-orthogonal to the axis extending normally to head expander top surface 204, cube fixture 100 must be raised off head expander 200, rotated about diagonal axis 327, and repositioned on the head expander so that a different, mutually orthogonal axis of the test object extends normally to top surface 204. To effect this repositioning, shaft 308 is rotated through a 120 degree arc about diagonal axis 327, which results in cube fixture 100 being rotated 90° so that a different, adjacent cube sidewall is positioned to extend in parallel with top surface 204 when lowered into engagement therewith.

Repositioning is accomplished by first depressing raise switch 508 on control panel 502 which causes its wipers 554 and 596 to move into contact with the associated NO terminals. Power is then transmitted from line 528, over line 598, wiper 596, the upper NO terminal, line 600, wiper 554, and line 594 to clamp timer 574, thereby activating the latter. At substantially the same time, power is also carried from the lower NO terminal of raise switch 508 over its wiper 554 and line 552 to clamp solenoid valve 410, causing the latter to close and cut off the supply of pressurized fluid to hydraulic clamps 212. Absent a supply of pressurized fluid, the return springs (not shown) in the clamps urge the clamp arms 240 back into the bodies of the clamps thereby unclamping cube fixture 100 from head expander 200.

After a predetermined period of time has passed from when power was first supplied to clamp timer 574 by the movement of raise switch wipers 554 and 596 into contact with the NO terminals of raise switch 508, clamp timer 574 supplies power through its NO terminal over line 572, through position switch wiper 570, and over line 568 to the raise relay of raise/lower solenoid valve 420. Preferably, as noted above, this predetermined period of time is slightly greater than the amount of time it takes the slowest one of clamps 212 to retract after the flow of pressurized fluid is cut off from the clamp by the closing of clamp solenoid valve 410. When the raise relay receives power, it opens causing pressurized fluid to flow through line 436 to hydraulic motor 370, causing the motor, and axle 320 coupled thereto, to rotate in a clockwise direction about transverse axis 318 so as to cause cube fixture 100 to raise up off head expander 200.

As soon as cube fixture 100 is raised slightly off head expander 200, lift microswitch 230 is released causing its wipers 556 and 558 to move into contact with its terminals B and E, respectively. Resultantly, power is supplied from line 528 via lines 580 and 560, through wiper 558, through terminal E, and over line 564 to lift up light 518, causing the latter to light. When light 518 is illuminated an operated is visually warned that the cube fixture 100 is being raised. Additionally, when raise switch 508 is depressed, power is supplied over line 598 through wiper 596, the associated NO terminal and over line 590 to sound alert 526, causing the latter to sound. Sound alert 526 is provided for audibly warning an operation when cube fixture is raised off head expander 200.

Except as noted below, as long as raise switch 508 is depressed, pressurized fluid will be supplied to hydraulic motor 370 and cube fixture 100 will continue to raise off head expander 200. If raise switch 508 is released, power will be cut off from the raise relay causing hydraulic motor 370 to stop rotating, with the result that cube fixture 100 will stop moving upwardly. As cube fixture 100 is raised up, trip arm 356 rotates with stub axle 320b until a point is reached where the trip arm 356 depresses piston 355 of microswitch 354 (FIG. 10a). When the piston 355 is depressed, wipers 570 and 562 are moved into contact with terminals C and F of position microswitch 354. In this position, power is no longer supplied over line 568 via terminal B to the raise relay of raise/lower solenoid valve 420, thereby closing the valve and cutting off the flow of fluid to hydraulic motor 370. Thus, even when raise switch 508 is depressed, as soon as microswitch piston 355 is depressed, upward rotation of cube fixture 100 is halted.

After position microswitch 354 is depressed, causing wiper 562 to contact terminal F, power is supplied over line 576 to wiper 578 of CCW switch 514. If it is desired to rotate cube fixture 100 in a clockwise direction about diagonal axis 327, CW switch 512 is depressed causing its wiper 624 to move into contact with the NO terminal of the CW switch. By this movement, power is supplied to the CW relay of CW/CCW solenoid valve 430 from line 528, over line 580, wiper 562 and terminal F, line 576, wiper 578, line 622, wiper 624, the NO terminal of CW switch 512, line 630, wiper 636 and line 638 to the CW relay. When the later receives power, it opens supplying pressurized fluid over line 427 (FIG. 11) to hydraulic motor 380 causing the latter to rotate in a clockwise direction about diagonal axis 327. This clockwise rotational drive is transmitted to shaft 308 (FIG. 8), and to cube fixture 100 attached to the shaft, so as to cause the cube fixture to rotate in a clockwise direction about the diagonal axis 327. Hydraulic fluid is returned from hydraulic motor 380 over line 428 and line 404 to pump system 400.

Thus, assuming prior to being raised up off head expander 200, cube fixture 100 was initially resting on sidewall 108, by depressing CW switch 512, shaft 308 is rotated in a clockwise direction through an arc of 120° about diagonal axis 327. Resultantly, cube fixture 100 attached to shaft 308 is repositioned by 90°, which results in sidewall 110 being positioned to engage and extend in parallel with top surface 204 when cube fixture 100 is lowered into contact therewith.

As cube fixture 100 rotates in a clockwise direction, collar 340 (FIG. 9) attached to shaft 308 also rotates in a clockwise direction, and wheel 352 of rotation microswitch 348 rolls along peripheral surface 342. When collar 340 has been rotated through a 120° arc, protrusion 344 passes beneath wheel 352, urging the latter and piston 350 attached thereto, upwardly toward the body of microswitch 348. As piston 350 is urged up into microswitch 348 it moves wiper 582 into contact with terminal C of microswitch 348. By this contact, power is supplied to terminals L1 and C of position timer 586. When wiper 582 is moved into contact with terminal C, the flow of power over line 584 to terminal C of position timer 586 activates the position time causing the latter to cut off the flow of power over line 650 to coils 640 and 648 of latching relay 628.

When power is cut off from coil 648, wiper 636 moves into contact with latching relay terminal 4. When wiper 636 contacts terminal 4, the flow of power over line 638 to the CW relay of CW/CCW solenoid valve 430 is cut off, causing the latter to close thereby cutting off the flow of pressurized fluid to hydraulic motor 380. When fluid flow to motor 380 is terminated, cube fixture 100 is no longer rotatably driven in a clockwise direction about diagonal axis 327.

Preferably, the selected period of time that position timer 586 cuts off power to coils 640 and 648 of latching relay 628 ranges from 3 to 15 seconds, with 6 seconds being the preferred period of time for power cutoff. Position timer 628 is provided to allow an operator to decide at each 120° increment of rotation of shaft 308, i.e. each time a new sidewall of cube fixture 100 has been positioned above head expander 200 so as to extend in parallel with top surface 204 when lowered onto the head expander, whether or not he or she desires to continue rotating the cube fixture. Thus, even when the operator continues depressing CW switch 512, after cube fixture 100 has rotated 120° about diagonal axis 327, the cube fixture will stop rotating about the diagonal axis for the selected period of time, e.g. 6 seconds.

If the operator selects to continue the clockwise rotation of cube fixture 100 about diagonal axis 327, he or she continues depressing CW switch 512, and after the selected period of time has passed, position timer 586 supplies power again to coil 648. This energization of coil 648 causes wiper 636 to move into contact with terminal 1 of latching relay 628, thereby coupling the CW relay of CW/CCW solenoid, valve 430 with power. When powered, valve 430 opens with the result that fluid is supplied over line 427 to hydraulic motor 380 causing the latter, and cube fixture 100 coupled therewith, to rotate in a clockwise direction about diagonal axis 327.

During the selected period of time that position timer 586 cuts off power to the CW relay of CW/CCW solenoid valve 430, or at any point during the clockwise rotation of cube fixture 100, the latter can be rotated in a counter-clockwise direction by releasing CW switch 512 and depressing CCW switch 514. When the latter is depressed, wiper 578 is moved into contact with the NO terminal of CCW switch 514. By this contact, power is supplied from power line 528 over line 580, wiper 562, line 576, wiper 578, line 626, wiper 632, and line 634 to the CCW relay of CW/CCW solenoid valve 430. When the latter receives power, it opens supplying pressurized fluid over line 428 to hydraulic motor 380 causing the latter, and shaft 308 and cube fixture 100 coupled therewith, to rotate in a counter-clockwise direction about diagonal axis 327. Fluid is returned over line 427 from hydraulic motor 380 to pump system 400 via lines 426 and 404.

During this counter-clockwise rotation, microswitch wheel 352 slides along peripheral surface 342 until protrusion 344 is reached, at which point wheel 352, and piston 350 attached thereto, are urged up into microswitch 348. This movement of piston 355 moves wiper 582 of rotation microswitch 348 into contact with terminal C, thereby activating position timer 586, as described above. Thus, position timer 586 energizes coils 640 and 648 for a selected period of time (e.g. 6 seconds), causing wiper 632 to move out of contact with terminal 3, thereby cutting off power to the CCW relay of CW/CCW solenoid valve 430. When power is cut off to the CCW relay, valve 430 cuts off the flow of hydraulic fluid over line 428 to hydraulic motor 380, with the result that the counter-clockwise rotation of cube fixture 100 is halted for the selected period of time. After the selected period of time has elapsed, or at any point during the counter-clockwise rotation of cube fixture 100, the latter can be rotated in a clockwise direction by releasing CCW switch 514 and depressing CW switch 512. It is to be appreciated that cube fixture 100 can be rotated continuously in either a clockwise or counter-clockwise direction for as long a period of time as is desired by maintaining CW switch 512 or CCW switch 514, respectively, in a depressed state.

Thus, assuming cube fixture 100 was initially resting on sidewall 108 prior to being raised up off head expander 200, by depressing CCW switch 514, shaft 308 is rotated in a counter-clockwise direction through an arc of 120° about diagonal axis 327. Resultantly, cube fixture 100 attached to shaft 308 is repositioned by 90°, which results in sidewall 102 being positioned to engage and extend in parallel with top surface 204 when cube fixture 100 is lowered into contact therewith.

Whenever the flow of power to both the CW and the CCW relays of CW/CCW solenoid valve 420 is cut off, fluid pressure supplied to hydraulic motor 380 over lines 427 and 428 also is cut off, as described above. Brake 476 (FIG. 11), by its coupling over lines 478 and 480 to lines 427 and 428, respectively, detects this drop in pressure, and is thereby activated to lock hydraulic motor 380 against further rotation. As soon as brake 476 detects sufficient pressure in lines 427 and 428, it deactivates, thereby permitting hydraulic motor 380 to rotate again.

Similarly, whenever the flow of power to both the raise and the lower relays of raise/lower solenoid valve 420 is cut off, fluid pressure supplied to hydraulic motor 370 over lines 436 and 438 also is cut off, as described above. Brake 484 (FIG. 11), by its coupling over lines 486 and 488 to lines 436 and 438, respectively, detects this drop in pressure, and is thereby activated to lock hydraulic motor 370 against further rotation. As soon as brake 484 detects sufficient pressure in lines 436 and 438, it deactivates, thereby permitting hydraulic motor 370 to rotate again.

During the rotation of cube fixture 100 about diagonal axis 327, wiper 582 of rotate microswitch 348 contacts terminal B, as noted above, whereby the flow of power to coil 620 of latching relay 604 is cut off. When deenergized, wipers 603 and 614 move into contact with terminals 1 and 3, thereby providing power to off axis light 524. When powered, light 524 provides a visual warning to the operator of the system that cube fixture 100 is not in a position where it can be lowered onto head expander 200. That is, none of the sidewalls of cube fixture 100 are positioned so as to extend in parallel with top surface 204 when lowered into contact therewith.

When microswitch wheel 352 contacts collar protrusion 344, and thereby moves wiper 582 into contact with terminal C of rotate switch 348, power is supplied to coil 620 of latching relay 604, with the result that on-axis light 522 receives power. When powered, on-axis light 522 provides a visual notification that cube fixture 100 is positioned to be lowered onto head expander 200, i.e., one of the sidewalls of the cube fixture will extend in parallel with top surface 204 when lowered into contact therewith.

When cube fixture 100 is located this position, the latter can be lowered onto head expander 200 by depressing lower switch 510. When the latter is depressed, its wiper 608 is moved into contact with the NO terminal of switch 510. By this connection, power is supplied from line 528 over line 580, line 560, wiper 556, line 552, wiper 554, line 602, wiper 603, line 611, wiper 608, and line 610 to the lower relay of raise/lower solenoid valve 420. Upon receipt of power, the lower relay opens valve 420 so that pressurized fluid is supplied over line 438 to hydraulic motor 370 causing the latter to rotate in a counter-clockwise direction about transverse axis 318. Fluid is returned from hydraulic motor 370 over line 438. This counter-clockwise rotation of hydraulic motor 370 is transmitted via split axle 320, block 304 attached to split axle 320, and shaft 308, to cube fixture 100, thereby moving the latter into engagement with head expander 200.

When cube fixture 100 is lowered to engage head expander 200, the lift microswitch 230 is depressed so as to move wiper 556 out of contact with terminal B, thereby cutting off the flow of power to lower switch 510, and hence to the lower relay of raise/lower solenoid valve 420. When power is cut from the lower relay of valve 420, the latter closes cutting off the flow of hydraulic fluid to hydraulic motor 370, so as to halt the counter-clockwise rotation of split axle 320 about transverse axis 318.

As discussed above, when lift microswitch 230 is closed, and wipers 556 and 558 are thus moved into contact with terminals B and E, respectively, no power is supplied to clamp solenoid valve 410. Under this condition, the latter opens supplying fluid to clamps 212 so as to cause the latter to clamp cube fixture 100 to head expander 200. As described above, if sufficient fluid pressure exists at clamps 212, as detected by pressure interlock 414, shaker table 700 can be activated so as to transmit vibration via head expander 200 and cube fixture 100 to the test object.

The foregoing describes a complete operational cycle of the present vibration test fixture system. The present invention is designed to support and reposition a test object so that vibration can be quickly and easily transmitted to the object along three mutually-orthogonal axes thereof. In typical operating conditions, vibration will be transmitted to the object as initially positioned in cube fixture 100. Next, the cube fixture 100 will be raised, shaft 308 will be rotated in a clockwise direction about diagonal axis 327 through an arc of 120° resulting in cube fixture 100 being repositioned by 90°, the cube fixture will be lowered to engage head expander 200, and the test object will be subjected to vibration testing. Finally, the cube fixture will be raised, shaft 308 will be rotated in a counter-clockwise direction through an arc of 240° resulting in the cube fixture being repositioned by 180°, the cube fixture will be lowered to engage head expander 200, and the test object will be subjected to vibration testing. By this manipulation, the test object is subjected to vibration applied along three-mutually orthogonal axes thereof.

While the foregoing is a typical method of operating the present invention the latter is designed to accommodate other vibration testing procedures. For instance, it may desired to test the object along only one or two of its axes. Alternatively, it may be desirable to perform vibration testing on three axes of the test object and then repeat the testing on one or more of the three axes. Such alternative testing procedures are controlled by appropriate selective operation of the CW switch 512 and CCW switch 514.

While hydraulic clamps are preferably used to clamp cube fixture 100 to head expander 200, and while hydraulic motors are preferably used to rotate cube fixture 100 about diagonal axis 327 and transverse axis 318, electro-mechanical clamps and electric motors could be satisfactorily employed in the alternative.

Although a cube fixture is preferably employed for supporting the test object, in the alternative a high-order polyhedron could also be satisfactorily employed when it is desired to subject the object to vibration along non-mutually-orthogonal axes.

Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

1. A vibration test apparatus comprising a shaker table having a shaker head, and a test fixture system for supporting and repositioning an object to be vibration tested, said test fixture system comprising:

cube fixture means for supporting said object to be tested in fixed angular relationship with said cube fixture means;

connection means for engaging and supporting said cube fixture means and for providing a mechanical and vibration transmissive connection between said cube fixture means and said shaker head, said connection means being affixed to said shaker head and having clamp means for releasably securing said cube fixture means to said connection means;

index means connected between said cube fixture means and said connection means for moving said cube fixture means relative to said connection means, said index means comprising first rotating means for rotating said cube fixture means through a selected arc about a transverse axis located adjacent to said cube fixture means between a first position in which said cube fixture means engages said connection means and a second position in which said cube fixture means is spaced from said connection means, and second rotating means for rotating said cube fixture means about a diagonal axis that extends diagonally through said cube fixture means so as to selectively locate said cube fixture means in a first predetermined orientation, a second predetermined orientation displaced a first predetermined angle in one direction from said first orientation, and a third predetermined orientation displaced a second predetermined angle in an opposite direction from said first orientation;

control means connected to said index means for controlling the operation of said index means so as to selectively rotate said cube fixture means about said transverse axis from one to the other of said first and second positions and about said diagonal axis from one to another of said first, second and third orientations.

2. An apparatus according to claim 1 wherein said second rotating means comprises a shaft secured to said cube fixture means and extending along said diagonal axis, and support means for rotatably supporting said shaft for rotation on said diagonal axis; and said first rotational means comprises a fixed support affixed to said connection means and pivot means pivotally supporting said support means for rotation about said transverse axis.

3. An apparatus according to claim 2 wherein said support means is a block in which said shaft is rotatably supported and said fixed support comprises a pair of plates disposed on opposite sides of said block, and said pivot means comprises to stub shafts attached to said plates and extending into said block at a right angle to said shaft.

4. An apparatus according to claim 3 further including drive means coupled to said shaft for selectively rotating said shaft on said diagonal axis.

5. An apparatus according to claim 4 wherein said drive means is a hydraulic motor attached to said block, said system further including pump means for supplying pressurized hydraulic fluid to said hydraulic motor.

6. An apparatus according to claim 3 further including a drive means coupled to said stub shafts for rotating said shaft on said transverse axis.

7. An apparatus according to claim 1, wherein said cube fixture means comprises five rectangular sidewalls secured together so as to form a hollow cube open at one side so as to provide access to its interior, and said diagonal axis extending through diagonally opposite corners of said cube.

8. An apparatus according to claim 7 further including securing means for securing said object to one of said five sidewalls or in the interior of said cube in fixed angular relationship to said diagonal axis.

9. An apparatus according to claim 8, wherein said securing means comprises first and second elongate track assemblies secured to the interior of said hollow cube, each of said first and second track assemblies comprising an inner track for supporting said object and an outer track for supporting said inner track for slidable movement therealong between an inner and an outer position, wherein said first and second track assemblies are sized and positioned so that when said inner tracks are positioned in said outer position, portions of said inner tracks extend through said open side to a location outside of said cube.

10. An apparatus according to claim 7, wherein said shaker table transmits vibrations predominantly along a predetermined vibration axis, said connection means comprises a substantially planar top surface for engaging one of said five sidewalls and thereby supporting said cube, said planar top surface extending normally to said vibration axis.

11. An apparatus according to claim 7, wherein said clamp means comprises a plurality of powered clamps secured to said planar top surface at selected locations thereon, each of said clamps comprising a movable clamp arm and the outer surfaces of each of said five sidewalls having notches positioned to receive said clamp arms and thereby permit said clamp arms to clamp said cube to said connection means.

12. An apparatus according to claim 11 wherein said clamps are hydraulic clamps, and further including pump means for supplying pressurized hydraulic fluid to said hydraulic clamps.

13. An apparatus according to claim 3, wherein said clamp means comprises:

a plurality of hydraulic clamps that clamp said cube fixture means to said connection means when pressurized hydraulic fluid is supplied to said plurality;

said apparatus further comprising:

a first hydraulic motor coupled to said shaft for rotating said shaft in a first direction about said diagonal axis when pressurized hydraulic fluid is supplied along a first path to said first hydraulic motor and in a second direction about said diagonal axis when pressurized hydraulic fluid is supplied along a second path to said first hydraulic motor;

a second hydraulic motor coupled to said stub shafts for rotating said stub shafts in a first direction about said transverse axis when pressurized hydraulic fluid is supplied along a third path to said second hydraulic motor and in a second direction about said transverse axis when pressurized hydraulic fluid is supplied along a fourth path to said second hydraulic motor; and pump means for providing pressurized hydraulic fluid to said plurality of hydraulic clamps, said first hydraulic motor and said second hydraulic motor.

14. An apparatus according to claim 13 further comprising:

clamp solenoid means coupled to said pump means, said plurality of hydraulic clamps and to said control means for (1) providing said pressurized fluid to said plurality of hydraulic clamps when a first signal is received from said control means and (2) for cutting off provision of said pressurized fluid to said plurality of hydraulic clamps when a second signal is received from said control means;

CW/CCW solenoid means coupled to said pump means, said first hydraulic motor, and said control means for providing pressurized fluid (1) along said first path when a third signal is received from said control means and (2) along said second path when a fourth signal is received from said control means;

raise/lower solenoid means coupled to said pump means, said second hydraulic motor, and said control means for providing pressurized fluid (1) along said third path when a fifth signal is received from said control means, and (2) along said fourth path when a sixth signal is received from said control means.

15. An apparatus according to claim 14, further including shaker interlock means for preventing said shaker table from vibrating when a disable signal is provided to said shaker interlock means, and pressure interlock means coupled between said clamp solenoid means and said plurality of hydraulic clamps for detecting the pressure of hydraulic fluid supplied to said plurality of hydraulic clamps and for generating and sending said disable signal to said shaker interlock means when said hydraulic pressure is insufficient to cause said plurality of hydraulic clamps to clamp said cube fixture to said connection means.

16. An apparatus according to claim 14, further wherein said control means provides said first signal to said clamp solenoid means only upon receipt of an engage signal, said system further comprising:

first microswitch means secured to said connection means and coupled to said control means for generating said engage signal when said cube fixture means engages said connection means and a disengage signal when said cube fixture means is disengaged from said connection means;

second microswitch means coupled between said pair of plates and said stub shafts and to said control means for generating an up signal when said cube fixture means is in said second position and a down signal when said cube fixture means is in said first position.

17. An apparatus according to claim 16, said control means further comprising sound alert means for generating an audible warning sound upon receipt of said disengage signal.

18. An apparatus according to claim 16, said control means further comprising a control panel on which first and second lights are mounted, wherein said control means illuminates said first light upon receipt of said engage signal and illuminates aid second light upon receipt of said disengage signal.

19. An apparatus according to claim 16, said control means further comprising:

a control panel;

raise switch means mounted on said control panel for causing said control means to transmit said fifth signal to said raise/lower solenoid means, when said raise switch means is depressed, so as t cause said second hydraulic motor to rotate said stub shafts in said first direction about said transverse axis until said control means receives said up signal from said second microswitch means;

lower switch means mounted on said control panel for causing said control means to transmit said sixth signal to said raise/lower solenoid means, when said lower switch means is depressed, so as to cause said second hydraulic motor to rotate said stub shafts in said second direction about said transverse axis until said control means receives said engage signal from said first microswitch means;

CW switch means mounted on said control panel for causing said control means to transmit said third signal to said CW/CCW solenoid means when said control means receives said up signal from said second microswitch means, so as to cause said first hydraulic motor to rotate said shaft in said first direction about said diagonal axis; and CCW switch means mounted on said control panel for causing said control means to transmit said forth signal to said CW/CCW solenoid means when said control means receives said up signal from said second microswitch means, so as to cause said first hydraulic motor to rotate said shaft in said second direction about said diagonal axis.

20. An apparatus according to claim 14, further wherein said control means terminates transmission of said third and fourth signals to said CW/CCW solenoid means for a selected period of time upon receipt of an on-axis signal and automatically begins retransmitting said third and fourth signals after said selected period of time has elapsed, said system further comprising:

microswitch means coupled to said shaft and said control means for providing (1) an on-axis signal when said cube fixture means and said shaft attached thereto have been rotated about said diagonal axis from one to another of said first, second and third orientations, and (2) an off-axis signal when said cube fixture means and. said shaft attached thereto are being rotated about said diagonal axis from on to another of said first, second and third orientations.

21. An apparatus according to claim 19, further wherein said control means automatically transmits said second signal to said clamp solenoid means automatically when said raise switch means is depressed, after a predetermined period of time has elapsed, so as to cause said plurality of hydraulic clamps to release said cube fixture means from said connection means, wherein said predetermined time is slightly greater than the amount of time it takes the slowest one of said plurality of hydraulic clamps to release its clamping grip on said cube fixture means.

22. An apparatus according to claim 1, further wherein said first predetermined angle is equal to 120° and said second predetermined angle is equal to 120°.

23. An apparatus according to claim 7 wherein said second rotating means comprises a shaft secured to said cube fixture means and extending along said diagonal axis so that when said shaft is rotated through said first predetermined angle said cue is repositioned in a first direction by 90° and is that when said shaft is rotated through said second predetermined angle said cube is repositioned in a second direction by 90°, and support means for rotatably supporting said shaft for rotation of said diagonal axis.

24. An apparatus according to claim 7, wherein said shaker table transmits vibrations predominantly along a predetermined vibration axis, said connection means comprises a substantially planar top surface for engaging one of said five sidewalls and thereby supporting said cube, said planar top surface extending parallel to said vibration axis.

25. An apparatus according to claim 1 wherein said connection means comprises a head expander.

26. An apparatus according to claim 25 wherein said connection means further comprises a sliptable coupled with said shaker head, said head expander being securable on said sliptable.

* * * * *